Figure 1:
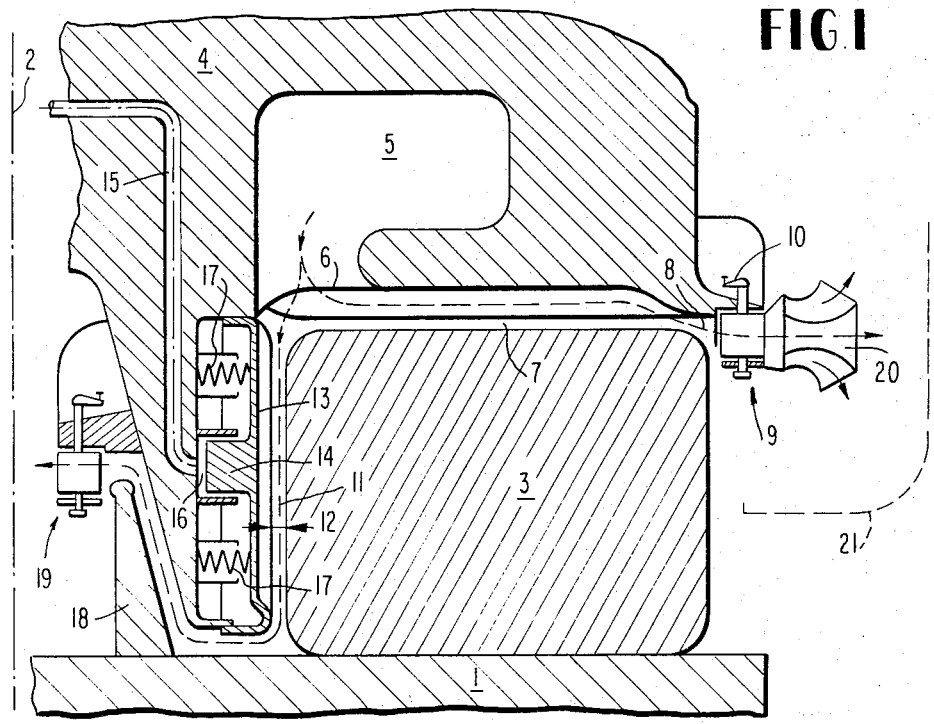

United States Patent [19]

Simon

[11] 3,820,468

[45] June 28, 1974

[54] AIR CUSHION VEHICLE, ESPECIALLY RAIL-BOUND AIR CUSHION VEHICLE

[75] Inventor: Michael Simon, Munich-Obermenzing, Germany

[73] Assignee: Maschinenfabrik Augsburg-Nurnberg Aktiengesellschaft, Munich, Germany

[22] Filed: July 17, 1972

[21] Appl. No.: 272,697

[30] Foreign Application Priority Data
July 17, 1971 Germany.......................... 2135902

[52] U.S. Cl.............. 104/23 FS, 180/122, 104/147
[51] Int. Cl........................................... B61b 13/08
[58] Field of Search.......... 104/23 FS, 134; 180/122

[56] References Cited
UNITED STATES PATENTS

| 3,172,495 | 3/1965 | Bliss.................................. | 180/122 |
| 3,249,165 | 5/1966 | Chaplin............................. | 180/122 |
| 3,566,797 | 3/1971 | Giraud............................. | 104/23 FS |

Primary Examiner—M. Henson Wood, Jr.
Assistant Examiner—D. W. Keen
Attorney, Agent, or Firm—Craig and Antonelli

[57] ABSTRACT

An air cushion vehicle, especially a rail-bound air cushion vehicle in which air is used both for the support of the vehicle above the roadway and for the propulsion of the vehicle whereby the air escaping out of the air cushion is deflected by way of guide devices into a horizontal direction parallel to the driving direction.

37 Claims, 2 Drawing Figures

AIR CUSHION VEHICLE, ESPECIALLY RAIL-BOUND AIR CUSHION VEHICLE

The present invention relates to an air cushion vehicle, especially to a rail-bound air cushion vehicle, in which air is utilized for the support of the vehicle above the roadway or track and for the propulsion of the vehicle.

With vehicles of this type as known heretofore, the air system for the generation of the supporting air cushion is separate from the air system for the generation of the propulsion. The air necessary for the production of the air cushion escapes out of gaps extending peripherally about the air cushion and is lost unutilized. Admittedly, one attempts by means of aprons, skirts and similar auxiliary means to keep the losses small which result from air escaping at the gaps, however, these losses cannot be avoided altogether in the hitherto known solutions.

It is the aim of the present invention to further reduce or completely eliminate these losses.

As solution to the underlying problem, it is proposed according to the present invention that the air laterally escaping out of the air cushion is deflected by way of guiding devices into a horizontal direction parallel to the driving direction.

The present invention thus utilizes a basically novel approach insofar as it does not attempt to permit as small as possible a quantity of air to escape out of the air cushions. Instead, the escape of air out of the air cushions is accepted as an unavoidable fact and is rendered useful in that either the escaping air is utilized for the propulsion of the vehicle, if the air is deflected in the guiding mechanisms in a direction opposite the driving direction, or in that the air is utilized for the braking of the vehicle if, more particularly, the air is deflected in the guide mechanisms in the driving direction.

In pursuance of this novel principle, the present invention even goes so far that not only the unavoidable air losses of the air cushion are accepted but that the air supply to the air cushion and the air discharge out of the air cushion are so matched to one another that the entire propulsion of the vehicle is effected by means of the air escaping out of the air cushion by way of the guide mechanisms and/or the entire air quantity which is necessary for the pneumatic propulsion of the vehicle, is readied by a corresponding high rate of air through-flow in the air cushion. This last solution or the high rate of air through-flow bring about that at high vehicle velocities the air gap between roadway or track and vehicle is enlarged to such an extent as a result of the high rate of air through-flow in the air cushion that relatively slight requirements can be made as to the accuracy of the line or way. Since the way or line costs, especially in systems with rail-bound air cushion vehicles represent a considerable portion of the overall costs of the system, it represents a considerable advantage if these line costs can be reduced which is the case if smaller requirements must be made of the line accuracy. This advantage illustrates that the present invention is applicable, though not exclusively, yet with particular advantage and therefore preferred to rail-bound air cushion vehicles. A further argument for the preferred application of the present invention to rail-bound air cushion vehicles resides in that in rail-bound air cushion vehicles the arrangement of the air guide mechanisms according to the present invention encounters fewer spatial difficulties than in vehicles independent of rails.

A rail-bound air cushion vehicle should be involved in every case when according to a further proposal of the present invention the air escaping out of the air cushion is utilized not only for the production of the propulsion and braking effect but also for the production of lateral control and stabilizing effects, for example, for the damping of rolling or irregular oscillating motions of the vehicles with respect to the rail.

The present invention additionally proposes that atmospheric air be admixed to the propulsion or braking air discharged out of the guide mechanisms with the aid of ejectors, collecting devices and the like. The effects obtained thereby correspond to the ones as are known from the field of aircraft jet-propulsion-units with by-pass air, i.e., in particular, on the one hand, an increase of the propulsion power and on the other, a reduction of the air discharge noises.

It is now customary with rail-bound air cushion vehicles that the vehicle is vertically supported with respect to the rail not only by means of one or several air cushions. Instead, the horizontal guidance of the vehicle with respect to the rail takes place frequently also by means of air cushions. The present invention proposes according to a further feature and development that not only the air of the vertically effective air cushions but also the air of the horizontally effective, lateral air cushions are utilized for attaining propulsion and braking energy. The air of the horizontal and of the vertical air cushions can thereby be caused to be discharged through the same or separate guide mechanisms.

The guide devices consist in particular of an unfolded or unwound blade ring, i.e., of a series of blade channels. The length of the blades and of the blade channels and of the guide mechanisms is dependent on the length of the vehicle and of the air cushion. The longer the vehicle, the longer become the air cushions and the longer become also the air guide devices. By reason of the vehicle propulsion with air which escapes through the unwound air guide blade rings, the operation of the subject matter of the present invention can be characterized by the designation thereof as air cushion-linear motor.

The construction of the rail on which the vehicle has to travel with the installation according to the present invention will, of course, have no influence on the construction and design of the air cushion linear motor, however, without affecting the basic applicability thereof. Thus, insofar as the rail is concerned, it may be a single rail or a two-rack rail and it is in principle of no significance whether the rail has a U profile, and I profile or a similar suitable profile.

Accordingly, it is an object of the present invention to provide an air cushion vehicle, particularly a rail-bound air cushion vehicle which avoids by simple means the aforementioned shortcomings and drawbacks encountered in the prior art.

Another object of the present invention resides in an air cushion vehicle which makes effective use of the air otherwise lost in the operation of the air cushion.

A further object of the present invention resides in an air cushion vehicle of the type described above which not only excels by high efficiency but additionally effectively utilizes the air required for the cushioning system for purposes of propelling the vehicle or braking the same as well as for purposes of controlling its stability.

A still further object of the present invention resides in a rail-bound air cushion vehicle which permits a decrease in the costs of the rails as regards manufacture thereof.

Figure 2:
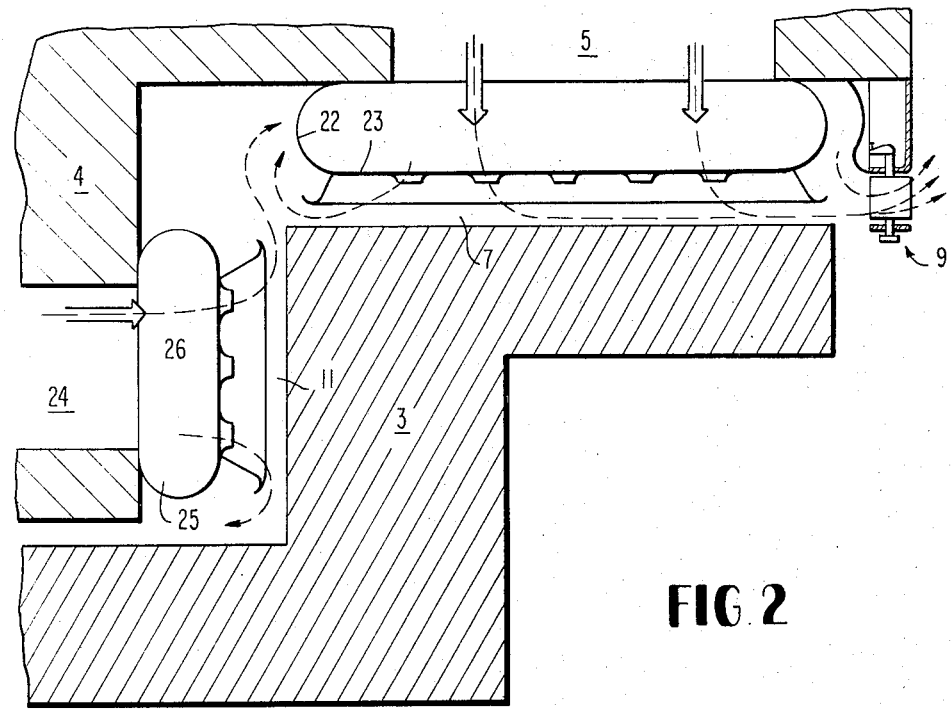

These and other objects, features and advantages of the present invention will become more apparent from the following description when taken in conjunction with the accompanying drawing which shows, for purposes of illustration only, two embodiments in accordance with the present invention, and wherein:

FIG. 1 is a partial, schematic, cross-sectional view through one embodiment of rail-bound air cushion vehicles in accordance with the present invention, and FIG. 2 is a partial, schematic, cross-sectional view through a modified embodiment of a rail-bound air cushion vehicle in accordance with the present invention.

Referring now to the drawing wherein like reference numerals are used throughout the two views to designate like parts, and more particularly to FIG. 1, reference numeral 2 designates in this figure the track center plane, with respect to which one guide rail each is symmetrically secured on the line 1. The vehicle body of the vehicle is designated by reference numeral 4. On each side of the vehicle body 4 is provided an air guide channel 5 extending over a considerable portion of the length of the vehicle body 4. Each air guide channel 5 is fed with pressure gas from a gas producer of conventional construction. The composition of the pressure gas depends on the type and construction of the gas producer and is of no importance to the present invention, whence reference will be made herein for the sake of simplicity to pressure gas or simply to pressure air. On each side of the vehicle, pressure air flows out of the air guide channel 5 by way of the discharge slot 6 thereof into the gap 7 between the vehicle body 4 and the rail 3 in order to form in the gap 7 an air cushion which together with the air cushion on the other vehicle side (not shown) supports or carries the vehicle body 4 in the vertical direction on the rails 3. The generation of pressure air is dependent on the velocity of the vehicle so that at high velocities, more air is fed into the gap 7 than at lower velocities and at high velocities, the gap 7 is wider than at low velocities.

The pressure air produced and supplied by the gap producer reaches the blade channels of the air cushion linear motor generally designated by reference numeral 9 by way of the air cushion in the gap 7 and by way of the lateral slot 8. The linear motor 9 is constituted by a series of blades which, in their turn, delimit air guide ducts or channels in which the air leaving the air cushion receives a discharge direction that extends parallel to the vehicle longitudinal direction. The blades are adjustable by means of an adjusting mechanism 10 of conventional construction in such a manner that the air is discharged either opposite the driving direction for the propulsion of the vehicle or in the driving direction for the braking of the vehicle. The length of the linear motor 9 corresponds essentially to the length of the air guide channel 5.

The lateral guidance of the vehicle body 4 with respect to the rails 3 takes place on each vehicle side by a lateral air cushion 11 within the gap 12 between the inner rail side and a plate 13 of the vehicle body 4. The plate 13 is supported by means of a bar 14 against a hydraulic pressure medium which is supplied to the guide means 16 of the bar 14 by way of a line 15. By changing the pressure medium supply, the position of the plate 13 and therewith the change of the width of the gap 12 can be effected. Springy or elastic abutments 7 serve for securing the plate 13 against tilting. The pressure air discharged out of the air cushion of the gap 12 is fed at the lower end of the vehicle body 4 by means of a gas guide bar 18 of the way or line 1 to a further linear motor generally designated by reference numeral 19 which in construction and operation corresponds to the linear motor 9. The effectiveness of the linear motors 9 and 19 can be improved if the air leaving the motors is sent through an ejector system 20 of conventional construction in which atmospheric air is torn along. The air also leaving the ejector 20 can be collected in a collecting channel or duct 21 if it is not to flow off directly into the atmosphere.

In the solution according to FIG. 1, the air of the carrying or supporting air cushion 7 becomes effective by way of the linear motor 9 whereas the air of the laterally guiding air cushion 11 becomes effective by way of the linear motor 19. In the solution according to FIG. 2, the air of both air cushions 7 and 11 is conducted through the linear motor 9 which is suited for a correspondingly higher rate of air flow. As to the rest, pressure air reaches from the pressure air channel 5 by way of the bellows 22 and the apertured plate 23 the carrying air cushion 7 and from a second pressure air channel 24 by way of the bellows 25 and the apertured plate 26 the laterally guiding air cushion 11. The plates 23 and 26 have the task to dampen rolling or irregular oscillatory motions.

The form of the line and/or of the rail depends on the local conditions while the vehicle body has to be matched to the line and rail. The present invention is independent of these system differences. Similarly, the present invention is independent of systems which differ in the manner of the air discharge. Whereas with most systems the air flows off horizontally out of the supporting cushion and out of the guide cushion, systems also exist which from the beginning possess a vertical discharge at least out of the air guide cushion (FIG. 2), and the present invention is also independent thereof. Finally, the air leaving laterally of as well as to the rear and in front of the air cushions can be rendered useful in the linear motors if separate linear motors are provided and/or the air is fed from the corresponding areas to the linear motors.

While I have shown and described two embodiments in accordance with the present invention, it is understood that the same is not limited thereto but is susceptible of numerous changes and modifications as are known to those skilled in the art and I therefore do not wish to be limited to the details shown and described herein but intend to cover all such changes and modifications as are encompassed by the scope of the appended claims.

What I claim is:

1. A gas cushion vehicle comprising:
   gas cushion means,
   gas supply means for supplying gas under pressure to said gas cushion means so that said vehicle is supported in the vertical direction by a gas cushion formed between said gas cushion means and a fixed vehicle guide track, said gas cushion means being configured such that a portion of the gas supplied thereto escapes as leakage gas from between said gas cushion means and said fixed vehicle guide track, and leakage gas guide means positioned downstream of said gas cushion means, said leakage gas guide means including means for discharging said leakage gas is substantially horizontal directions parallel to the travel direction of said vehicle along said guide track such that said leakage gas imparts at least one of driving and braking forces to said vehicle.

2. A vehicle according to claim 1, wherein said leakage gas guide means are separate from gas cushion wall means which delimit the lateral boundaries of said gas cushion means.

3. A vehicle according to claim 2, wherein said means for discharging said leakage gas includes means for discharging all of the leakage gas within said leakage gas guide means in said directions parallel to said driving direction, whereby all energy of the discharged leakage gas is utilized for imparting at least one of driving and braking forces to said vehicle.

4. A vehicle according to claim 3, wherein said vehicle is an air cushion with air being said gas supplied by said gas supply means.

5. A vehicle according to claim 1, wherein said means for discharging said leakage gas includes means for discharging all of the leakage gas within said leakage gas guide means in said directions parallel to said driving direction, whereby all energy of the discharged leakage gas is utilized for imparting at least one of driving and braking forces to said vehicle.

6. A vehicle according to claim 1, wherein said vehicle guide track is a rail means, further comprising:

lateral gas cushion means, further gas supply means for supplying gas under pressure to said lateral gas cushion means such that said vehicle is laterally guided by a gas cushion formed between said lateral gas cushion means and said rail means, said lateral gas cushion means being configured such that a portion of the gas supplied thereto escapes as further leakage gas from between said lateral gas cushion means and said rail means, and further leakage gas guide means positioned downstream of said lateral gas cushion means, said further leakage gas guide means including means for discharging said further leakage gas in substantially horizontal directions parallel to the travel direction of said vehicle such that said further leakage gas imparts one of driving and braking forces to said vehicle.

7. A vehicle according to claim 6, wherein each of said leakage gas guide means are separate from gas cushion wall means which form boundaries around respective ones of said gas cushion means and said lateral gas cushion means, and wherein each of said means for discharging said leakage gas includes means for discharging all of the leakage gas within said respective leakage gas guide means in said directions parallel to said driving direction, whereby all energy of the discharged leakage gas is utilized for imparting at least one of driving and braking forces to said vehicle.

8. A vehicle according to claim 7, wherein said leakage gas guide means includes separate linear motor means for the leakage gas of each of said gas cushion means and said further gas cushion means.

9. A vehicle according to claim 7, wherein said leakage gas guide means include a common linear motor means for discharging leakage gas from both of said gas cushion means.

10. A vehicle according to claim 1, characterized in that the vehicle is a rail-bound air cushion vehicle.

11. A vehicle according to claim 1, characterized in that for the propulsion of the vehicle the leakage gas is deflected by the leakage gas guide means into a substantially horizontal direction opposite the driving direction.

12. A vehicle according to claim 1, characterized in that for purposes of deceleration of the vehicle the leakage gas is deflected by the leakage guide means into a substantially horizontal direction in the driving direction.

13. A vehicle according to claim 1, characterized in that all of the gas of the gas cushion means is deflected by way of the leakage gas guide means and is utilized for the propulsion or braking of the vehicle.

14. A vehicle according to claim 1, characterized by means of admixing atmospheric air to the gas flowing out of the gas cushion means and deflected by way of the leakage gas guide means.

15. A vehicle according to claim 14, characterized in that the means for admixing atmospheric air includes ejector means and collecting means which are connected downstream of the guide means.

16. A vehicle according to claim 1, wherein said vehicle guide track is a rail means, characterized by further means for producing control effects for the vehicle with respect to the rail means by the discharged gas.

17. A vehicle according to claim 15, characterized in that said further means dampens the rolling movement of the vehicle with respect to the rail means.

18. A vehicle according to claim 1, characterized in that leakage gas guide means include rows of blade means on each side of the vehicle.

19. A vehicle according to claim 18, characterized in that the rows of blade means form linear motor means.

20. A vehicle according to claim 18, characterized in that the blade means of the leakage gas guide means are adjustable.

21. A vehicle according to claim 1, wherein said vehicle guide track is a rail means, further comprising lateral gas cushion means for the lateral guidance of the vehicle with respect to the rail means, characterized in that the gas from both gas cushion means is discharged by way of a separate leakage gas guide means each.

22. A vehicle according to claim 1, wherein said vehicle guide track is a rail means, further comprising lateral gas cushion means for the lateral guidance of the vehicle with respect to the rail means, characterized in that the gas is discharged out of both gas cushion means by way of a common leakage gas guide means.

23. An air cushion vehicle in which air is used for the support of the vehicle above a roadway and for the propulsion of the vehicle, characterized by air cushion means and means for deflecting the air escaping out of the air cushion means by way of guide means into an at least approximately horizontal direction substantially parallel to the driving direction, characterized by means for admixing atmospheric air to the air flowing out of the air cushion means and deflected by way of the guide means, and characterized in that the means for admixing atmospheric air includes ejector means and collecting means which are connected downstream of the guide means.

24. An air cushion vehicle according to claim 23, characterized in that the air for the production of the entire necessary propulsion and braking energy is discharged by way of the guide means and is removed from the air cushion means.

25. An air cushion vehicle according to claim 24, characterized in that all of the air cushion means is deflected by way of the guide means and is utilized for the propulsion or braking of the vehicle.

26. A rail-bound air cushion vehicle according to claim 25, which runs on rail means, characterized by further means for producing control effects for the vehicle with respect to the rail means by the discharged air.

27. An air cushion vehicle according to claim 26, characterized in that said further means dampens the rolling movements of the vehicle with respect to the rail means.

28. An air cushion vehicle according to claim 27, characterized in that the guide means include rows of blade means on each side of the vehicle.

29. An air cushion vehicle according to claim 28, characterized in that the rows of blade means form linear motor means.

30. An air cushion vehicle according to claim 28, characterized in that the blade means of the guide means are adjustable.

31. A rail-bound air cushion vehicle according to claim 30, with air cushion means for the vertical support of the vehicle on rail means and lateral air cushion means for the lateral guidance of the vehicle with respect to the rail means, characterized in that the air from both air cushion means is discharged by way of a separate air guide means each.

32. A rail-bound air cushion vehicle according to claim 31, with air cushion means for the vertical support of the vehicle on rail means and lateral air cushion means for the lateral guidance of the vehicle with respect to the rail means, characterized in that the air is discharged out of both air cushion means by way of a common guide means.

33. An air cushion vehicle according to claim 32, characterized in that for the propulsion of the vehicle the air is deflected by the guide means into a substantially horizontal direction opposite the driving direction.

34. An air cushion vehicle according to claim 32, characterized in that for purposes of deceleration of the vehicle the air is deflected by the guide means into a substantially horizontal direction in the driving direction.

35. An air cushion vehicle in which air is used for the support of the vehicle above a roadway and for the propulsion of the vehicle, characterized by air cushion means and means for deflecting the air escaping out of the air cushion means by way of guide means into an at least approximately horizontal direction substantially parallel to the driving direction, and characterized in that the air for the production of the entire necessary propulsion and braking energy is discharged by way of the guide means and is removed from the air cushion means wherein said means for deflecting air are disposed laterally spaced from said air-cushion means, which vertically support said vehicle.

36. An air cushion vehicle according to claim 35, characterized in that all of the air cushion means is deflected by way of the guide means and is utilized for the propulsion or braking of the vehicle.

37. An air cushion vehicle according to claim 36, characterized by means for admixing atmospheric air to the air flowing out of the air cushion means and deflected by way of the guide means.

* * * * *